United States Patent
Bussit et al.

(10) Patent No.: US 9,127,711 B2
(45) Date of Patent: Sep. 8, 2015

(54) ANGULAR CONTACT BEARING ASSEMBLY FOR USE IN A STEERING COLUMN

(71) Applicant: Aktiebolaget SKF, Göteborg (SE)

(72) Inventors: Sylvain Bussit, Monnaie (FR); Daniel Jansen, Tours (FR); Thomas Lepine, Villandry (FR); Bruno Montboeuf, Cerelles (FR)

(73) Assignee: AKTIEBOLAGET SKF, Gothenburg (CH)

( * ) Notice: Subject to any disclaimer, the term of this patent is extended or adjusted under 35 U.S.C. 154(b) by 0 days.

(21) Appl. No.: 13/946,688

(22) Filed: Jul. 19, 2013

(65) Prior Publication Data

US 2014/0033856 A1   Feb. 6, 2014

(30) Foreign Application Priority Data

Jul. 20, 2012   (EP) .................................. 12290242

(51) Int. Cl.
| | |
|---|---|
| *F16C 19/04* | (2006.01) |
| *F16C 19/16* | (2006.01) |
| *F16C 25/08* | (2006.01) |
| *F16C 35/077* | (2006.01) |
| *F16C 19/06* | (2006.01) |
| *B62D 1/16* | (2006.01) |
| *B60R 16/027* | (2006.01) |
| *F16C 35/073* | (2006.01) |
| *F16C 27/04* | (2006.01) |
| *F16C 27/06* | (2006.01) |

(52) U.S. Cl.
CPC ............. *F16C 19/163* (2013.01); *B60R 16/027* (2013.01); *B62D 1/16* (2013.01); *F16C 19/06* (2013.01); *F16C 25/08* (2013.01); *F16C 25/083* (2013.01); *F16C 27/04* (2013.01); *F16C 27/066* (2013.01); *F16C 35/073* (2013.01); *F16C 35/077* (2013.01); *F16C 2202/32* (2013.01)

(58) Field of Classification Search
USPC .......... 384/490, 517, 535, 536, 537, 538, 539
See application file for complete search history.

(56) References Cited

U.S. PATENT DOCUMENTS

| | | | |
|---|---|---|---|
| 4,530,609 A | 7/1985 | Jasperse et al. | |
| 6,179,473 B1 * | 1/2001 | Ponson et al. | ................. 384/537 |
| 6,375,360 B1 * | 4/2002 | Weisskopf et al. | ........... 384/538 |
| 8,421,319 B2 * | 4/2013 | Miura et al. | ................... 310/425 |
| 2003/0099419 A1 * | 5/2003 | Vignotto et al. | .............. 384/539 |
| 2010/0308569 A1 | 12/2010 | Delos | |

(Continued)

FOREIGN PATENT DOCUMENTS

| | | |
|---|---|---|
| DE | 10220688 B4 | 11/2010 |
| EP | 1184583 A1 | 3/2002 |

(Continued)

*Primary Examiner* — Faye M Fleming
(74) *Attorney, Agent, or Firm* — Bryan Peckjian; SKF USA Inc. Patent Dept.

(57) ABSTRACT

The invention relates to an angular contact bearing assembly for use in a steering column, comprising at least one rolling bearing comprising conductive components, a sleeve for mounting an conductive inner ring of the at least one rolling bearing on a shaft; and at least one conductive structure creating an electrically conductive contact between at least one of the conductive components of the at least one rolling bearing and the shaft. It is proposed that the sleeve and the conductive structure form an inseparable compound.

11 Claims, 6 Drawing Sheets

(56) References Cited

U.S. PATENT DOCUMENTS

2012/0210819 A1* 8/2012 Delos et al. ............ 74/492
2014/0020501 A1* 1/2014 Bussit et al. ............ 74/492

FOREIGN PATENT DOCUMENTS

| EP | 1988002 A1 | 11/2008 |
| FR | 2782758 A1 | 3/2000 |

* cited by examiner

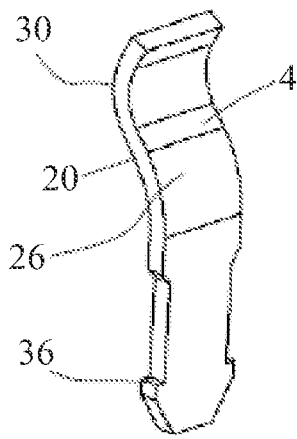 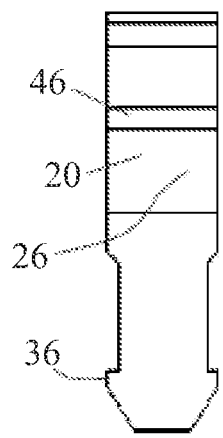 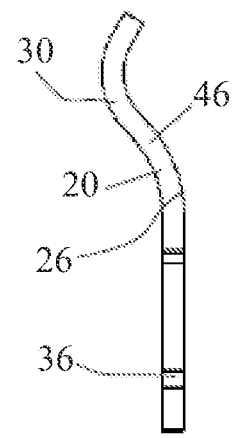
FIG. 7A  FIG. 7B  FIG. 7C
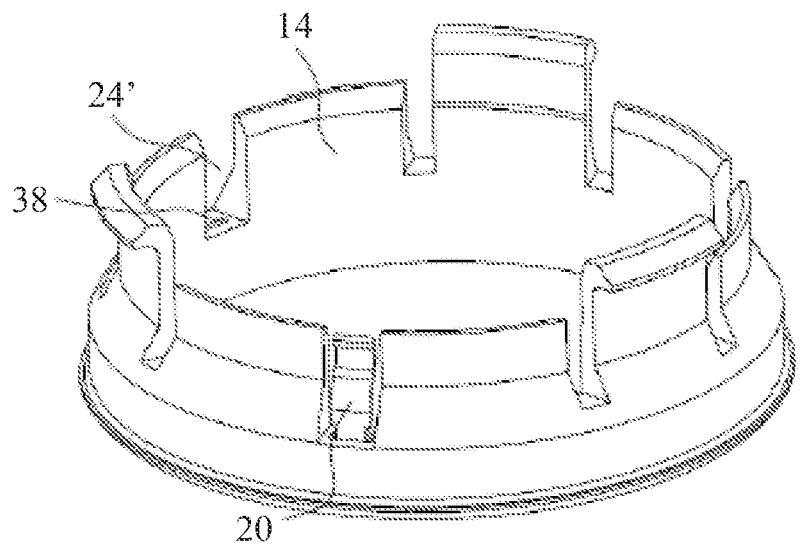
FIG. 8 ial Utility Patent Application claiming the benefit of European Patent Application Number 12290242.2 filed on 20 Jul. 2012, which is incorporated herein in its entirety.

ANGULAR CONTACT BEARING ASSEMBLY FOR USE IN A STEERING COLUMN

CROSS-REFERENCE TO RELATED APPLICATION

This application is a United States Non-Provisional Utility Patent Application claiming the benefit of European Patent Application Number 12290242.2 filed on 20 Jul. 2012, which is incorporated herein in its entirety.

TECHNICAL FIELD

The invention relates to an angular contact bearing assembly in a steering column.

BACKGROUND ART

Steering columns in automobiles are generally equipped with angular contact bearing assemblies comprising a conductive inner ring with a concave recess forming a first raceway, a conductive outer ring with a concave recess forming a second raceway and a set of conductive balls contacting both the first raceway and the second raceway. In order to simplify the mounting of the inner ring on a central shaft of the steering column, the inner ring is mounted on the shaft via a sleeve or tolerance ring, which is usually moulded of non-conductive plastics in order to allow for some flexibility and to reduce the costs.

Steering wheels mounted on the shaft often contain electrical switches or devices and/or airbags, which may be affected by electrostatic charges accumulating on the steering wheel.

It is therefore important to ensure an electrical grounding of the steering wheel by ensuring a conductive contact between the shaft of the steering column and the chassis of the automobile via the angular ball bearings. As a matter of course, this conductive contact could be used for transmitting electrical signals as well.

The document U.S. Pat. No. 4,530,609 teaches to make the sleeve conductive by using a graphite-filled polymer material, which is, however, fairly expensive.

In order to ensure the electrical contact, mentioned above the document FR 2782758 A1 teaches to use a conductive part creating an electrically conductive contact between the inner ring and the shaft. This conductive part is a generally ring-shaped member arranged between an axial end face of the sleeve and a wavy spring or ondular washer generating an axial preload of the angular bearing. The wavy spring is preloaded with a fixing ring fitted over the shaft.

The ring-shaped member is provided with a ring-shaped main body and a latch bent around the profile of the sleeve so as to overlap with a surface supporting the inner ring such that the inner ring is in contact with the latch. The electrically conductive contact between the outer ring and the shaft is therefore established from the outer ring via the balls, the inner ring, the latch, the main body of the ring-shaped member, the wavy spring, and the fixing ring.

A similar solution with a conductive element having a ring-shaped main body and multiple latch-like axial protrusions engaging in slots of the sleeve is proposed in the document U.S. Pat. No. 6,675,360 B1.

A solution where the latches are immediately formed on the wavy spring is proposed in US 2010/0308569A1. A solution where latches are formed on the inner ring is proposed in DE 102 20 688 B4.

In this conductive pathway, there is a high number of contact points which are susceptible to degradation or interruption of the contact and the total probability of failure accumulates the individual probabilities. The conductive parts risk to break or be shifted from their proper position. This may lead to problems during the assembly or interruptions of the contact. The loose parts may damage other parts of the steering column or its surroundings.

DISCLOSURE OF INVENTION

The invention has been made in an attempt to solve these problems and proposes an angular contact bearing assembly comprising:
at least one rolling bearing with conductive components; and
at least one conductive structure creating an electrically conductive contact between one of the at least one conductive components of the rolling bearing and the shaft,
wherein the sleeve and the at least one conductive structure form an inseparable compound.

The angular contact bearing assembly for use in a steering column according to the invention comprises at least one rolling bearing with conductive components, a sleeve for mounting the conductive inner ring on a shaft, and at least one conductive structure creating an electrically conductive contact between one of the conductive components of the at least one rolling bearing and the shaft.

In particular the conductive components of the at least one rolling bearing include a conductive inner ring with a concave recess forming a first raceway, a conductive outer ring with a concave recess forming a second raceway, and a set of conductive balls contacting both the first raceway and the second raceway.

The invention proposes to fix the conductive structure to the sleeve in such a way that the sleeve and the conductive structure form an inseparable compound. In particular, the conductive structure might have at least a fixed portion overmolded with the sleeve or the conductive structure is integrally moulded with the sleeve or fixed using another type of material bond, e.g. by pressing a conductive structure provided with barbs into a slot provided in the sleeve. An unintended loss or loosening of the conductive structure may be avoided as well as resulting problems in the assembly procedure.

Further, it is proposed to provide the conductive structure with a first elastically deformable contact portion to the conductive component and a second elastically deformable contact portion to the shaft, and preferably with a force transmitting portion connecting the first contact portion and second contact portion. At least the contact portions protrude from a non-conductive material of the sleeve. The conductive structure, in particular the force transmitting portion, is arranged such that the pressure applied to the first contact portion and/or to the second contact portion is at least partially transferred to the other contact portion respectively. The contact portions are preloaded upon mounting the conductive structure in the inner ring or on the shaft and the pressure transfer to the invention needs an increase of the contact pressure to the inner ring when the sleeve is mounted on the shaft and vice versa. As a consequence, a good contact can be ensured in a simple way, the tolerances of the parts may be increased and the costs of the assembly may be reduced.

In a preferred embodiment, the conductive structure has a protruding portion in the form of a tongue bent in an S-shape, wherein the contact portions are formed by convex parts of the S-shape pointing in essentially opposite directions respectively. This enables an uncomplicated and cheap manufacturing of the conductive structure. The connection between the sleeve and the conductive structure may be improved by providing the conductive structure with an anchoring structure for anchoring the sheet-metal part in a plastic material of the sleeve.

If sleeve is provided with a recess receiving and laterally guiding at least a protruding portion of the conductive structure, an unconscious shifting or loosening of the conductive structure may be avoided, and the probability of failures may be further reduced. Preferably, the recess is formed as an axial recess, wherein the protruding portion of the conductive structure protrudes from a bottom of the recess in an axial direction. In particular, the recess may extend from a radial inner surface of the sleeve to a radial outer surface of the sleeve, wherein the radial inner surface is configured to be fitted over a shaft and the radial outer surface is configured to support the conductive inner ring.

The effects of the invention are particularly pronounced if the elastically deformable contact portion contacting the inner ring or the shaft is configured such that it is deformed and preloaded when fitting the assembly including the sleeve and the conductive structure over the shaft or when fitting the conductive inner ring over the sleeve.

As an alternative, the at least one conductive structure is integrally overmolded with the sleeve except contact portions merging from the sleeve. These contact portions ensure an electrically conductive contact between one of the conductive components of the rolling bearing and the shaft.

Multiple conductive structures distributed over the circumference of this sleeve may be used. Preferably, this distribution is homogenous and in a preferred embodiment each conductive structure or tongue protruding from a common bottom part is complemented by a corresponding part arranged diametrically opposite with respect to a symmetry axis of sleeve.

A wavy spring generating a preload of the angular contact bearing may be formed separately from the conductive structure and provides more freedom for the choice of materials or may be formed integrally with the ring-shaped body part in the embodiment where the conductive structure is provided with tongues forming the contact portions. Preferably, the conductive structure is formed as a stamped sheet metal piece and the main body of the sleeve is made of plastic.

A further aspect of the invention proposes a steering column for an automotive vehicle comprising a chassis with a mounting support, a shaft and at least one angular contact bearing assembly as discussed above, wherein the angular contact bearing assembly is mounted on the chassis mounting support and supporting the shaft.

The above embodiments of the invention as well as the appended claims and figures show multiple characterizing features of the invention in specific and non-limiting combinations. The skilled person will easily be able to consider further combinations or sub-combinations of these features in order to adapt the invention as defined in the claims to his or her specific needs.

BRIEF DESCRIPTION OF DRAWINGS

The invention will be better understood on reading the description which will follow, given solely by way of non-limiting example and made with reference to the attached drawings in which:

FIGS. 7A-7C are different views of a conductive structure of a sleeve according to a third embodiment of the invention;

FIG. 8 is a perspective view of a sleeve of the angular contact bearing assembly according to the third embodiment of the invention;

DETAILED DESCRIPTION

Figure 1:
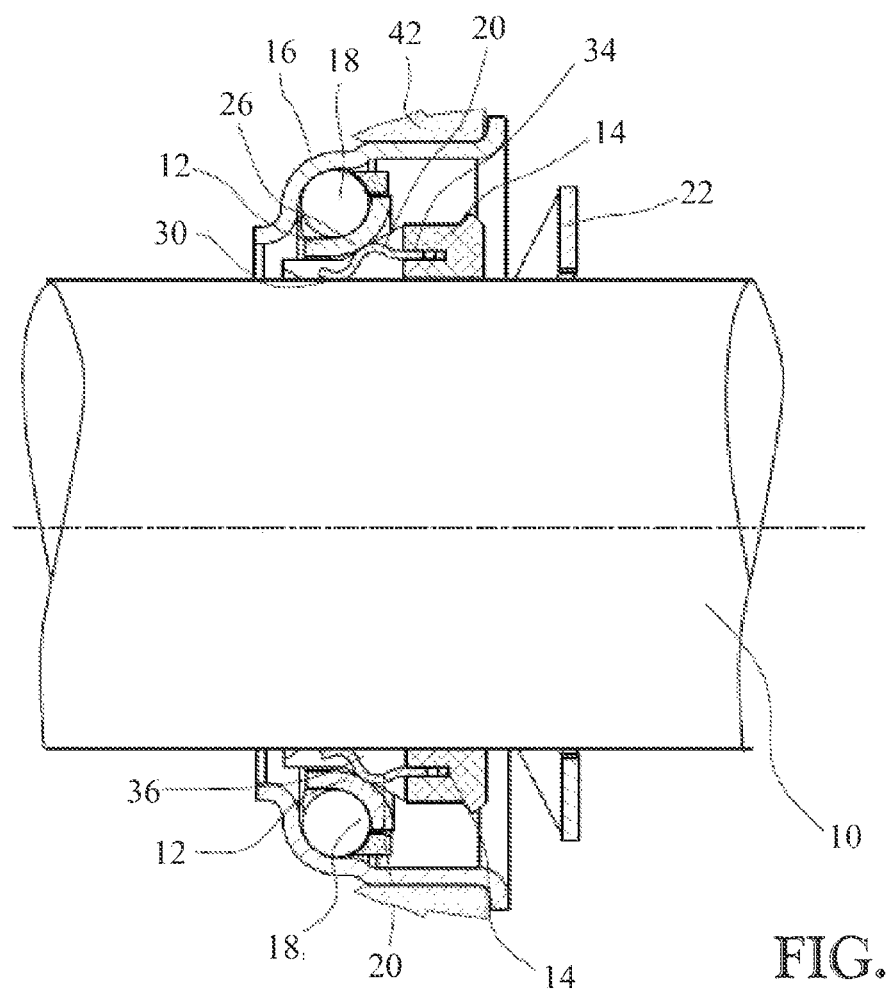
FIG. 1 is a schematic view of a steering column with an angular contact bearing assembly according to the invention.

FIG. 1 is a schematic sectional view of an angular contact bearing assembly in a steering column of an automobile. The bearing assembly is mounted on a central shaft 10 connecting a steering wheel with steering rods (not shown).

The angular contact bearing assembly comprises a conductive inner ring 12 with a concave recess forming a first raceway. The inner ring 12 is formed as a stamped a hardened sheet-metal piece in the illustrated embodiment, but could be made massive in the alternative.

The inner ring 12 is mounted on the shaft 10 via a plastic sleeve 14 contacting a conical inner surface of the inner ring 12 and has a certain elasticity such that the inner surface of the sleeve 14 is deformed radially inward when the inner ring 12 is pressed on the sleeve 14 such that a force-fitting connection between the inner ring 12 and the sleeve 14 is established.

Further, the angular contact bearing assembly comprises a conductive outer ring 16 with a concave recess forming a second raceway and being mounted in electrical contact with the chassis and the grounding of the automobile. The outer ring 16 is formed as a stamped a hardened sheet-metal piece in the illustrated embodiment, but could be made massive in the alternative.

A set of conductive balls 18 contacting both the first raceway and the second raceway is guided in a cage (not shown) and establishes an electrically conductive contact between the inner ring 12 and the outer ring 16.

Figure 2:
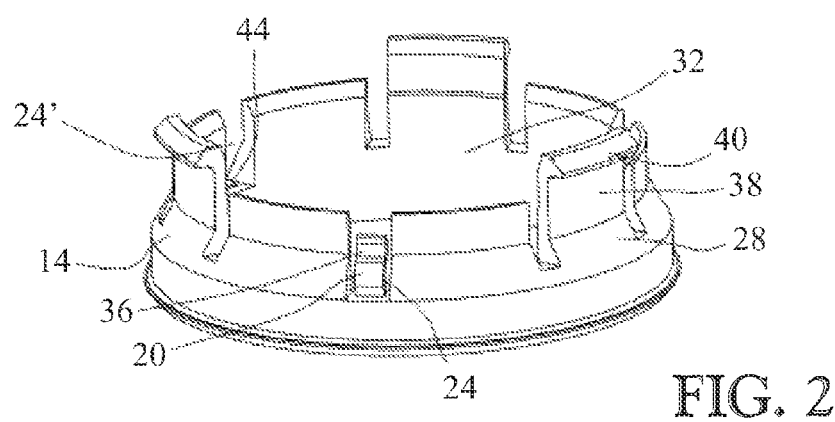
FIG. 2 is a perspective view of a sleeve of the angular contact bearing assembly of FIG. 1.

FIG. 2 shows the sleeve 14 in a perspective view. As the sleeve 14 is non-conductive, a means for creating an electrically conductive contact between the inner ring 12 and the shaft 10 is needed on order enable a discharging of static electricity from the shaft 10 to the chassis of the automobile because accumulating static electricity could affect the function of electrical or electronic elements arranged on the steering wheel and/or electrical shocks.

In order to create this electrically conductive contact, the invention proposes to provide least one conductive structure 20 creating an electrically conductive contact between the inner ring 12 and the shaft 10.

The angular contact bearing is preloaded with a corrugated or wavy spring 22 or an ondular washer abutting to an axial end face of the sleeve 14 in order to generate an axial preload of the angular contact bearing assembly. The wavy spring 22 is a part separate from the conductive structure 20 and made of elastic steel, whereas the conductive structure 20 may optionally be coated with or made of copper or other highly conductive materials.

FIG. 2 is a perspective view of a sleeve 14 of the angular contact bearing assembly of FIG. 1. The sleeve 14 is provided with three recesses 24 with a width basically, i.e. besides of some tolerance, corresponding to the width of the three conductive structures 20. In FIG. 2, the recess 24' on the upper left hand side is not equipped with a conductive structure 20 for illustrative reasons only. The recess 24' is provided with a slot 44 for receiving a conductive structure 20.

The recess 24 comprises an axial recess in a brim of the sleeve 14 and extends from a radial inner surface 32 of the sleeve 14 to a radial outer surface 28 of the sleeve 14, wherein the radial inner surface 32 is configured to be fitted over a shaft 10 and the radial outer surface 28 is configured to support the conductive inner ring 12. Though the first embodiment illustrated here is provided with three tongue-like conductive structures 20, it is clearly possible to use more or less conductive structures 20 distributed over the circumference of the sleeve 14 and fixed in pertinent recesses respectively. The brim is provided with further axial slots creating radially flexible latches 38. Three of the latches 38 are provided with snap-fitting protrusions projecting 40 radially outward and having a chamfered end-face. The snap-fitting protrusions 40 will snap over an axially outer edge of the outer ring 16 such that the sleeve 14 loosely fixes the inner ring 12 to the outer ring 16.

Three identical conductive structures 20 are provided in the first embodiment of the invention. Each of the conductive structures 20 is formed as a tongue 36 protruding from the bottom of a recess 24 in the sleeve 14, wherein the tongue 36 is S-shaped and forms with its bent portions first and second elastically deformable contact portions 26, 30, respectively. The tongues 36 are arranged in slot-like recesses 24 of the sleeve 14 such that the width direction thereof is arranged tangentially in a radial section and that the tongues 36 are freely movable in a radial direction of this recess 24.

The S-shape of the tongues 36 is configured such that a first convex contacting portion 26 for contacting the inner ring 12 of the bearing assembly and a second contacting portion 30 contacting the shaft 10 are created.

The conductive structures 20 have a fixed portion 23 overmoled with the plastic sleeve 14, which is thus an inseparable compound or composite part and the conductive structures 20 are not separable from the rest of the sleeve. The overmolding creates a material joint between the conductive structures 20 and the polymer body of the sleeve 14, i.e. an inseparable compound. In alternative embodiments, the material joint could be created with adhesive or by press-fitting a conductive structure provided with barbs into a slot such as the slot 44 in the recess 24' in FIG. 2 in the plastics material of the sleeve. As an alternate embodiment not disclosed on the Figures, the conductive structures 20 can be integrally moulded with the plastic sleeve 14.

For manufacturing the sleeve 14, the tongue-like conductive structures 20 are arranged in a mould for moulding the sleeve 14 in an injection moulding process such that fixing- or anchoring portions 34 like holes in the fixed portion 23 of conductive structures 20, which may be provided with barbs or a zigzag profile to improve the fixation, are immersed in the polymer material used when the latter sets.

Figures 3A, 3B, 3C:
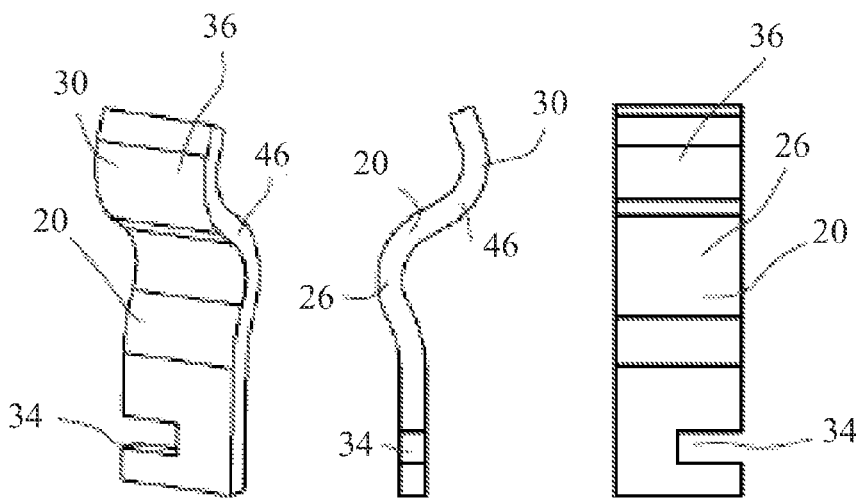
FIG. 3a-3c are different views of a conductive structure of the sleeve in FIG. 2 prior to being overmolded.
Figure 4:
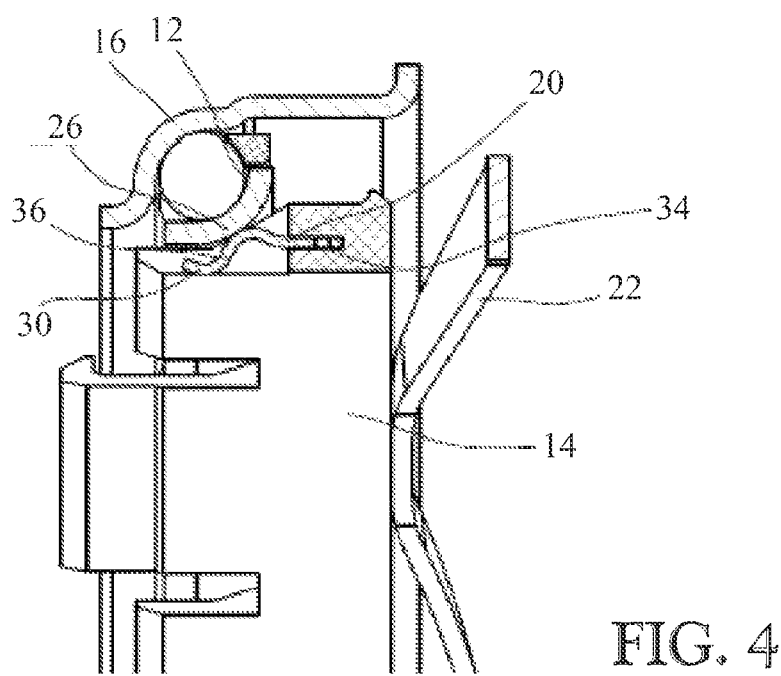
FIG. 4 is a sectional view of the angular contact bearing assembly with the sleeve and the conductive structure of FIGS. 2 and 3.
Figures 5A, 5B, 5C:
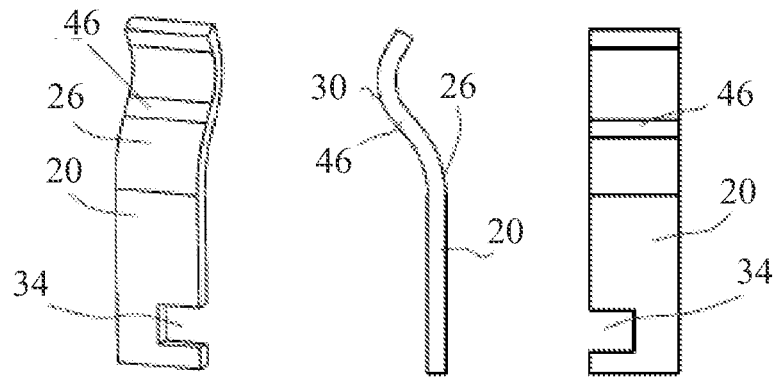
FIGS. 5A-5C are different views of a conductive structure of the sleeve according to a second embodiment of the invention.
Figure 6:
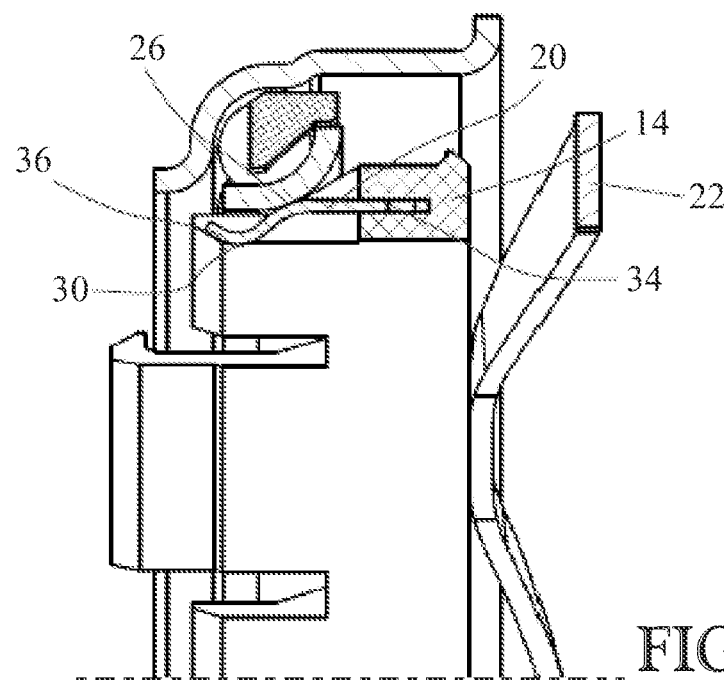
FIG. 6 is a perspective view of a sleeve of the angular contact bearing assembly according to the second embodiment of the invention.
Figure 9:
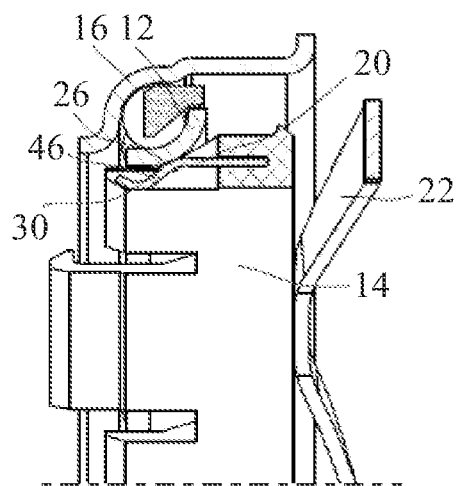
FIG. 9 is a sectional view of the angular contact bearing assembly according to the third embodiment of the invention.

FIGS. 3A-3C are different views of the conductive structure 20 prior to being moulded into the sleeve 14. The conductive structure 20 is bent out of a strip-shaped, rectangular piece of elastic stainless steel and is composed of an S-shaped protruding portion with the contacting portions and the anchoring portion 34, which has a lateral cut-out which will be filled with the polymer material of the sleeve 14 when being overmolded and improves the connection between the body of the sleeve and the conductive structure.

The conductive structure 20 is provided with a first elastically deformable portion 26 contacting the conductive inner ring 12, wherein said first elastically deformable portion 26 is configured such that it is deformed and preloaded when fitting the conductive inner ring 12 over the sleeve 14. This means that the first elastically deformable portion 26 projects radially and axially over the conoidal outer surface 28 of the sleeve 14 in the non-preloaded state prior to fitting the inner ring 12 onto the assembly.

In a similar way, the conductive structure 20 is provided with a second elastically deformable portion 30 configured to contact the shaft 10, wherein said second elastically deformable portion 30 is configured such that it is deformed and preloaded when fitting the assembly including the sleeve 14 and the conductive structure 20 over the shaft 10. In other words, the second elastically deformable portion 30 projects radially inward over the cylindrical inner surface 32 of the sleeve 14 in the unpreloaded state prior to fitting the sleeve 14 onto the shaft 10.

The assembly is illustrated in the sectional view of FIG. 1. Since pressure is exerted on both the first elastically deformable portion 26 and the second elastically deformable portion of the conductive structure 20, the conductive structure 20 is compressed radially. The elastic restoring force of the conductive structure 20 generates a contact pressure by which the first elastically deformable portion 26 and the second elastically deformable portion 30 of the conductive structure 20 are strongly pressed against the shaft 10 and the inner ring 12 respectively such that a good electrical contact is ensured.

Upon mounting the conductive structure 20 pre-assembled with the sleeve 14 on the shaft 10, the pressure generated due to the deformation of the second elastically deformable contact portion 30 is partially transferred via the force transmitting portion 46 onto the first elastically deformable contact portion 26 so as to increase the contact pressure thereof. In order to effect this, the force transmitting portion 46 is bent and moved in its longitudinal direction in response to the elastic deformation of the second contact portion 30.

When the sleeve 14 is inserted or pressed into the inner ring, the first contacting portion 26 comes into contact with the radial inner conical surface of the inner ring 12 and is pressed radially inward by this surface such that the second contacting portion 30 is moved radially inward so as to protrude over the radial inner surface of the sleeve 14 up to a radius smaller than the radius of the shaft 10. The most remote axial end of the conductive structure 20 is bent radially outward again such that it is safely outside of the radius of the shaft 14 before the shaft is inserted. When inserting the shaft 10 with its chamfered end into the sleeve, the second contacting portion 30 is pressed radially outward and the pressure is partially supported by the first contacting portion 26 such that the reliability of the electric contact between the first contacting portion 26 and the inner ring 12 is improved by inserting the shaft 14.

FIGS. 5-11 show a further embodiments of the invention. The following description focuses on differences to the embodiments of FIGS. 1-4, whereas the reader should refer to the foregoing description of FIGS. 1-4 for features which are essentially unchanged. Similar or identical features are provided with the same reference numbers in order to highlight the similarities.

In the embodiment of FIGS. 5A-5C and FIG. 6, the angular contact bearing assembly is provided with a conductive structure 20 according to a second embodiments of the invention, wherein S-Shape of the protruding portion of the conductive structure 20 is less pronounced, in particular the first elastically deformable contact portion 26 for creating contact to the inner ring 12 does not project radially over an outer radius of the anchoring portion 34 of the conductive structure, which is arranged parallel to the axis of the shaft 10.

FIGS. 7A-7C, 8, 9 and 10A-10C illustrate a third embodiment of the invention. The conductive structures 20 are formed as lengthy pins which may be inserted into pertinent slots 44 provided in the bottom of recesses 24 of a sleeve 14. The fixing portion of the conductive structures 20 is provided with barbs 34 engaging with the plastic material of the sleeve 14 such that an inseparable connection between the sleeve 14 and the conductive structures 20 is created.

The sleeve 14 is provided with recesses 24, from the bottom of which the conductive structures 20 protrude axially in an S-shape, which is configured such that a first convex contacting portion 26 for directly contacting the inner ring 12 of the bearing assembly and a second convex contacting portion 30 for directly contacting the shaft 10 are created.

Figures 10A, 10B, 10C:
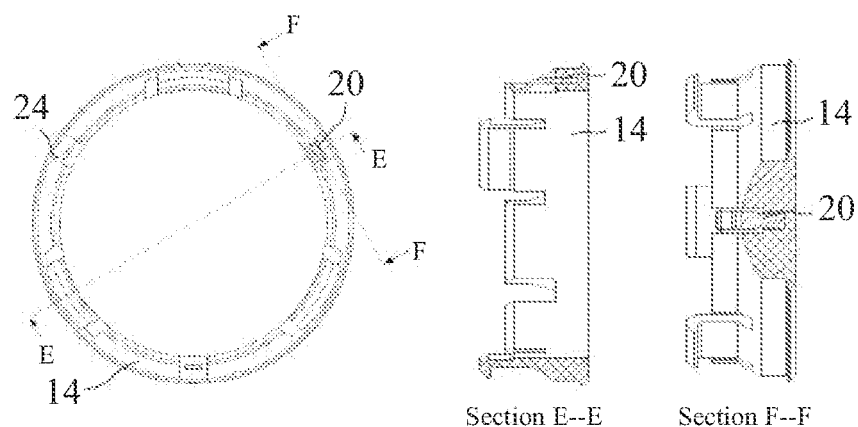
FIGS. 10A-10C are further different views of the sleeve according to the third embodiment of the invention.

FIG. 10A is a top view of the sleeve 14 with the conductive structures 20 and FIGS. 10B and 10C are sectional views along the lines E-E and F-F in FIG. 10A respectively.

Figure 11:
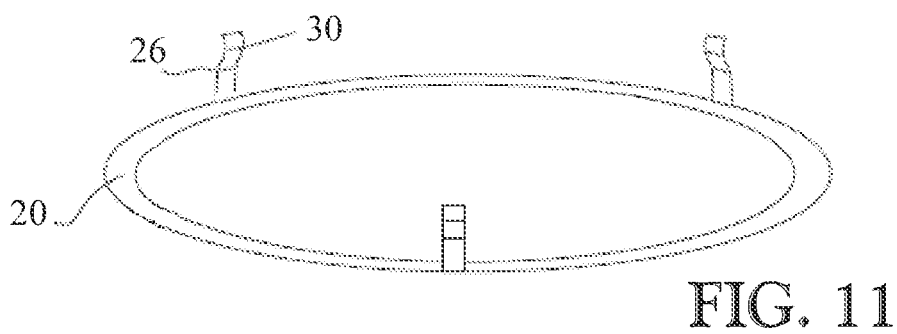
FIG. 11 is a perspective view of a conductive structure according to a fourth embodiment of the invention.

FIG. 11 is a perspective view of a conductive structure according to a fourth embodiment of the invention. The conductive structure 20 is comprises a ring-shaped body and the sleeve is integrally overmolded with the sleeve (not illustrated) except from contact portions 26, 30 emerging from the sleeve 14 and ensuring an electrically conductive contact between one of the conductive components 12 of the rolling bearing and the shaft 10.

What is claimed is:

1. An angular contact bearing assembly for use in a steering column, comprising:
    at least one rolling bearing with conductive components; and
    at least one conductive structure creating an electrically conductive contact between one of said at least one conductive components of said rolling bearing and a shaft,
    a sleeve and said at least one conductive structure form an inseparable compound,
    wherein said at least one conductive structure has a fixed portion molded with said sleeve and a protruding portion, the at least one conductive structure further comprising,
    a first elastically deformable contact portion to said inner ring,
    a second elastically deformable contact portion to said shaft, and
    a force transmitting portion connecting said first contact portion and said second contact portion,
    wherein said force transmitting portion is arranged such that a pressure applied to said first contact portion and/or to said second contact portion is at least partially transferred to said other contact portion respectively.

2. The angular contact bearing assembly according to claim 1, wherein said protruding portion of said at least one conductive structure is in a form of a tongue bent in a S-shape, wherein said contact portions are formed by convex parts of said S-shape pointing in essentially opposite directions respectively.

3. The angular contact bearing assembly according to claim 1, wherein said sleeve further comprises a recess receiving and laterally guiding at least a protruding portion of said at least one conductive structure.

4. The angular contact bearing assembly according to claim 3, wherein said recess extends from a radial inner surface of said sleeve to a radial outer surface of said sleeve, wherein said radial inner surface is configured to be fitted over a shaft and said radial outer surface is configured to support said conductive inner ring.

5. The angular contact bearing assembly according to claim 1, wherein said at least one conductive structure is formed as a strip-like sheet-metal part provided with an anchoring structure for anchoring said sheet-metal part in a plastic material of said sleeve.

6. Angular contact bearing assembly according to claim 1, wherein said at least one conductive structure is integrally overmolded with said sleeve except contact portions emerging from said sleeve and ensuring an electrically conductive contact between one of said conductive components of said rolling bearing and said shaft.

7. An angular contact bearing assembly for use in a steering column, comprising:
    at least one rolling bearing with conductive components; and
    at least one conductive structure creating an electrically conductive contact between one of said at least one conductive components of said rolling bearing and a shaft,
    a sleeve and said at least one conductive structure form an inseparable compound,
    wherein said at least one conductive structure is provided with a first elastically deformable contact portion to said conductive component and a second elastically deformable contact portion to said shaft, wherein at least said contact portions protrude from a non-conductive material of said sleeve,
    the sleeve being configured to directly abut the outer ring such that the sleeve limits axial displacement of the outer ring away from the inner ring and from the sleeve.

8. The angular contact bearing assembly according to claim 7, further comprising a recess formed as an axial recess, wherein said protruding portion of said at least one conductive structure protrudes from a bottom of the recess in an axial direction.

9. An angular contact bearing assembly for use in a steering column, comprising:
    at least one rolling bearing with conductive components; and
    at least one conductive structure creating an electrically conductive contact between one of said at least one conductive components of said rolling bearing and a shaft,
a sleeve and said at least one conductive structure form an inseparable compound,
    wherein said at least one conductive structure further comprises:
    a first elastically deformable contact portion to said inner ring,
    a second elastically deformable contact portion to said shaft, and
    a force transmitting portion connecting said first contact portion and said second contact portion, wherein said force transmitting portion is arranged such that a pressure applied to said first contact portion and/or to said second contact portion is at least partially transferred to said other contact portion respectively.

10. The angular contact bearing assembly according to claim 9, wherein said at least one conductive structure has a fixed portion molded with said sleeve and a protruding portion.

11. The angular contact bearing assembly according to claim 9, wherein said at least one conductive structure is provided with a first elastically deformable contact portion to said conductive component and a second elastically deformable contact portion to said shaft, wherein at least said contact portions protrude from a non-conductive material of said sleeve.

* * * * *